(12) United States Patent
Geyer

(10) Patent No.: US 10,661,203 B2
(45) Date of Patent: May 26, 2020

(54) ENHANCED LIQUID FILTER BAG

(71) Applicant: Fred Geyer, Rensselaer, IN (US)

(72) Inventor: Fred Geyer, Rensselaer, IN (US)

( * ) Notice: Subject to any disclaimer, the term of this patent is extended or adjusted under 35 U.S.C. 154(b) by 965 days.

(21) Appl. No.: 14/478,407

(22) Filed: Sep. 5, 2014

(65) Prior Publication Data

US 2016/0067635 A1    Mar. 10, 2016

(51) Int. Cl.
*B01D 29/27* (2006.01)
*B01D 36/02* (2006.01)
*B01D 29/00* (2006.01)
*B01D 29/11* (2006.01)
*B01D 27/14* (2006.01)
*B01D 46/00* (2006.01)

(52) U.S. Cl.
CPC ........... *B01D 29/27* (2013.01); *B01D 27/148* (2013.01); *B01D 29/0029* (2013.01); *B01D 29/0034* (2013.01); *B01D 29/0038* (2013.01); *B01D 29/11* (2013.01); *B01D 36/02* (2013.01); *B01D 23/04* (2013.01); *B01D 46/0023* (2013.01); *B01D 46/0024* (2013.01)

(58) Field of Classification Search
CPC .. B01D 29/27; B01D 29/0038; B01D 29/004; B01D 29/0029; B01D 29/11; B01D 29/0034; B01D 36/02; B01D 27/148; B01D 23/04; B01D 46/0024; B01D 46/0023

See application file for complete search history.

(56) References Cited

U.S. PATENT DOCUMENTS

| | | | | | |
|---|---|---|---|---|---|
| 2,725,986 | A | * | 12/1955 | Marvel | B01D 17/045 210/184 |
| 3,019,184 | A | * | 1/1962 | Brown | B01D 29/05 210/333.01 |
| 4,986,912 | A | * | 1/1991 | Fisch | B01D 17/0202 210/448 |
| 5,417,855 | A | * | 5/1995 | Gershenson | B01D 29/27 210/232 |
| 2012/0261359 | A1 | * | 10/2012 | Quintel | B01D 24/042 210/806 |

FOREIGN PATENT DOCUMENTS

WO    WO 9005012 A1 *    5/1990    ......... B01D 17/0202

* cited by examiner

*Primary Examiner* — Lucas A Stelling
*Assistant Examiner* — Angel Olivera
(74) *Attorney, Agent, or Firm* — Ice Miller LLP

(57) ABSTRACT

An enhanced liquid filter bag is disclosed. The enhancements to a liquid filter bag disclosed herein include the addition of an internal filter cartridge and the addition of a liquid impermeable liner material that directs the flow of liquid to a centrally located void in the internal filter cartridge.

7 Claims, 7 Drawing Sheets

ENHANCED LIQUID FILTER BAG

BACKGROUND

Liquid filter bags are used in liquid filtration process. Liquids, such as water, containing solid contaminants are introduced into a liquid filter bag in a liquid filtration process. The liquid flows through the liquid filter bag's filtration media. The liquid filter bag's filtration media captures the solid contaminants, so the liquid emerging through the liquid filter bag's filtration media is cleaner than the liquid entering the liquid filter bag. Liquid filter bags come in a number of standardized sizes designed to fit within housings of a corresponding size. Liquid filter bags are constructed of different filtration media designed to filter solid contaminants of a predetermined size.

It is desired to provide enhancements to a liquid filter bag that improve the lifespan and efficiency of a liquid filter bag.

SUMMARY

An enhanced liquid filter bag is disclosed. The enhancements to a liquid filter bag disclosed herein include the addition of an internal filter cartridge and the addition of a liquid impermeable liner material that directs the flow of liquid to a centrally located void in the internal filter cartridge. The addition of an internal filter cartridge enhances the lifespan and efficiency of a liquid filter bag. Significantly more solid contaminants can be filtered from a flowing liquid by an enhanced liquid filter bag comprising an internal filter cartridge according to the present disclosure than by a typical liquid filter bag alone. An enhanced liquid filter bag comprising an internal filter cartridge according to the present disclosure also will need to be replaced less frequently than a typical liquid filter bag.

In at least one embodiment, a liquid filter bag according to the present disclosure comprises a bag shaped filter material comprising an open end and a closed end and enclosing a volume; and a liquid impermeable liner material, the liquid impermeable liner material having a first open end, a second open end, and a substantially tubular shape, the first open end of the liquid impermeable liner material secured to an inside surface of the bag shaped filter material near the open end of the bag shaped filter material. In at least one embodiment, such a liquid filter bag according to the present disclosure further comprises a filter cartridge, the filter cartridge having a cylindrical shape, a top end, a bottom end, an external wall, and an internal wall, the external wall and the internal wall being substantially concentric, the internal wall defining a void that extends from the top end to the bottom end of the filter cartridge, the filter cartridge installed within the volume of the bag shaped filter material with the bottom end of the filter cartridge adjacent an internal surface of the closed end of the bag shaped filter material. In at least one embodiment, such a liquid filter bag according to the present disclosure further comprises a rigid core within the void, the rigid core having cylindrical shape, the rigid core abutting the internal wall of the filter cartridge. In at least one embodiment, such a liquid filter bag according to the present disclosure further comprises a liquid impermeable cap installed over the void at the bottom end of the filter cartridge. In at least one embodiment, such a liquid filter bag according to the present disclosure further comprises a fabric flap, the fabric flap constructed of a liquid permeable material, the fabric flap having a first open end, a second open end, and a substantially tubular shape, the fabric flap installed over the liquid impermeable liner material with the first open end of the fabric flap secured to the inside surface of the bag shaped filter material near the open end of the bag shaped filter material and between the liquid impermeable liner material and the inside surface of the bag shaped filter material. In at least one embodiment of such a liquid filter bag according to the present disclosure, the second end of the fabric flap and the second end of the liquid impermeable liner material are inserted into the void adjacent the top end of the filter cartridge, whereby the fabric flap and the liquid impermeable liner cover the top end of the filter cartridge except for a portion of the void.

In at least one embodiment, a liquid filter bag according to the present disclosure comprises a bag shaped filter material comprising an open end and a closed end and enclosing a volume; and a filter cartridge, the filter cartridge having a cylindrical shape, a top end, a bottom end, an external wall, and an internal wall, the external wall and the internal wall being substantially concentric, the internal wall defining a void that extends from the top end to the bottom end of the filter cartridge, the filter cartridge installed within the volume of the bag shaped filter material with the bottom end of the filter cartridge adjacent an internal surface of the closed end of the bag shaped filter material. In at least one embodiment, such a liquid filter bag according to the present disclosure further comprises a rigid core within the void, the rigid core having cylindrical shape, the rigid core abutting the internal wall of the filter cartridge. In at least one embodiment, such a liquid filter bag according to the present disclosure further comprises a liquid impermeable cap installed over the void at the bottom end of the filter cartridge. In at least one embodiment, such a liquid filter bag according to the present disclosure further comprises a liquid impermeable liner material, the liquid impermeable liner material having a first open end, a second open end, and a substantially tubular shape, the first open end of the liquid impermeable liner material secured to an inside surface of the bag shaped filter material near the open end of the bag shaped filter material. In at least one embodiment of such a liquid filter bag according to the present disclosure, the second end of the liquid impermeable liner material is inserted into the void adjacent the top end of the filter cartridge, whereby the liquid impermeable liner covers the top end of the filter cartridge except for a portion of the void. In at least one embodiment, such a liquid filter bag according to the present disclosure further comprises a fabric flap, the fabric flap constructed of a liquid permeable material, the fabric flap having a first open end, a second open end, and a substantially tubular shape, the fabric flap installed over the liquid impermeable liner material with the first open end of the fabric flap secured to the inside surface of the bag shaped filter material near the open end of the bag shaped filter material and between the liquid impermeable liner material and the inside surface of the bag shaped filter material. In at least one embodiment of such a liquid filter bag according to the present disclosure, the second end of the fabric flap is inserted into the void adjacent the top end of the filter cartridge, whereby the fabric flap covers the top end of the filter cartridge except for a portion of the void.

In at least one embodiment, a liquid filter bag according to the present disclosure comprises a bag shaped filter material comprising an open end and a closed end and enclosing a volume; and a fabric flap, the fabric flap constructed of a liquid permeable material, the fabric flap having a first open end, a second open end, and a substantially tubular shape, with the first open end of the fabric flap secured to the inside surface of the bag shaped filter material near the open end of the bag shaped filter material. In at least one embodiment, such a liquid filter bag according to the present disclosure further comprises a filter cartridge, the filter cartridge having a cylindrical shape, a top end, a bottom end, an external wall, and an internal wall, the external wall and the internal wall being substantially concentric, the internal wall defining a void that extends from the top end to the bottom end of the filter cartridge, the filter cartridge installed within the volume of the bag shaped filter material with the bottom end of the filter cartridge adjacent an internal surface of the closed end of the bag shaped filter material. In at least one embodiment, such a liquid filter bag according to the present disclosure further comprises a rigid core within the void, the rigid core having cylindrical shape, the rigid core abutting the internal wall of the filter cartridge. In at least one embodiment, such a liquid filter bag according to the present disclosure further comprises a liquid impermeable cap installed over the void at the bottom end of the filter cartridge. In at least one embodiment of such a liquid filter bag according to the present disclosure, the second end of the fabric flap is inserted into the void adjacent the top end of the filter cartridge, whereby the fabric flap covers the top end of the filter cartridge except for a portion of the void. In at least one embodiment, such a liquid filter bag according to the present disclosure further comprises a liquid impermeable liner material, the liquid impermeable liner material having a first open end, a second open end, and a substantially tubular shape, the liquid impermeable liner installed within the fabric flap, the first open end of the liquid impermeable liner material secured to an inside surface of the bag shaped filter material near the open end of the bag shaped filter material, with the first open end of the fabric flap secured to the inside surface of the bag shaped filter material between the liquid impermeable liner material and the inside surface of the bag shaped filter material. In at least one embodiment of such a liquid filter bag according to the present disclosure, the second end of the liquid impermeable liner material is inserted into the void adjacent the top end of the filter cartridge, whereby the liquid impermeable liner covers the top end of the filter cartridge except for a portion of the void.

BRIEF DESCRIPTION OF THE DRAWINGS

The features and advantages of this disclosure, and the manner of attaining them, will be more apparent and better understood by reference to the following descriptions of the disclosed embodiments, taken in conjunction with the accompanying drawings, wherein.

DESCRIPTION

Figure 1:
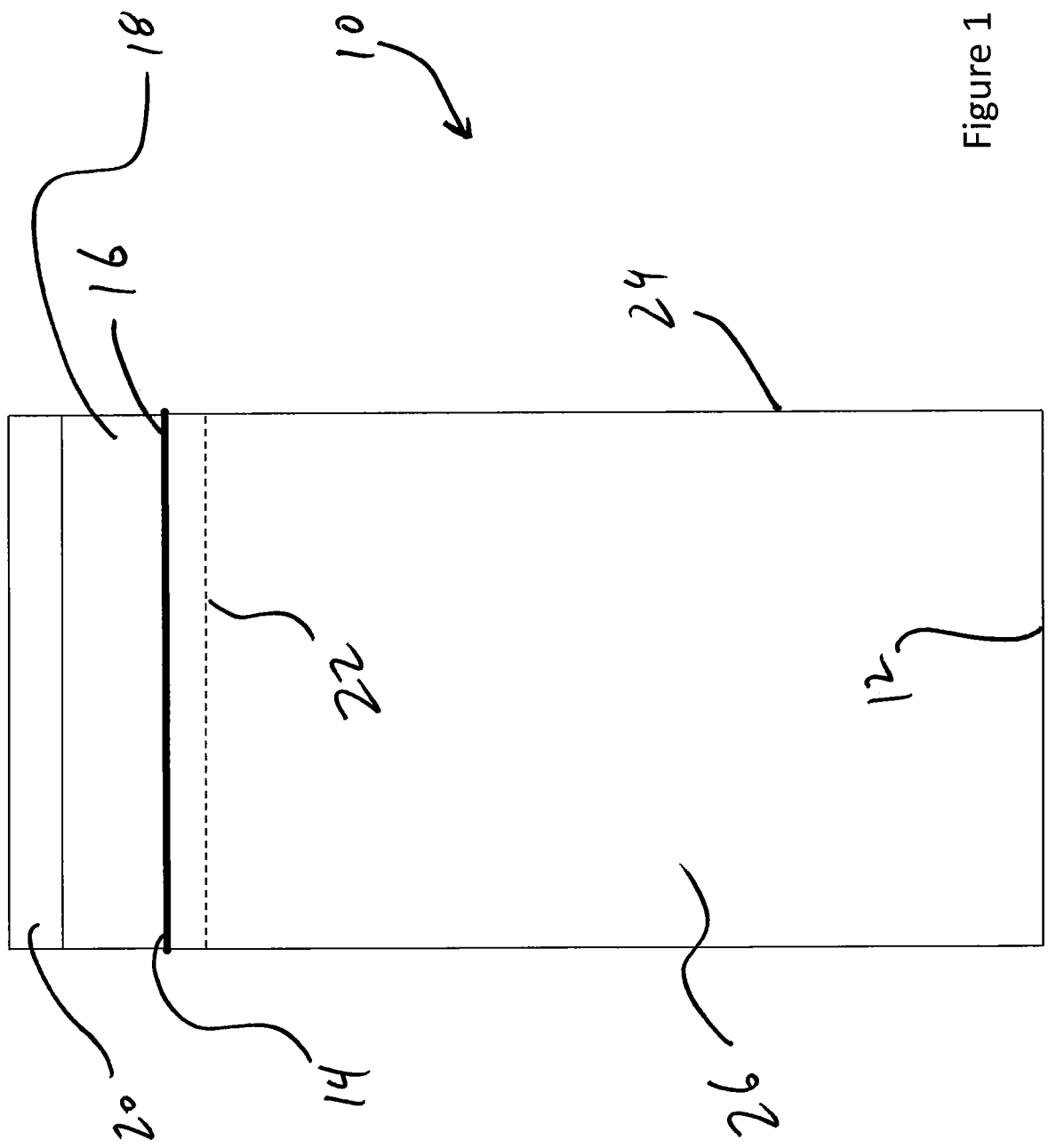
FIG. 1 shows a side view of an enhanced liquid filter bag according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a side view of enhanced liquid filter bag 10 according to at least one embodiment of the present disclosure. Enhanced liquid filter bag 10 is constructed from a liquid filter bag 24 of a type known in the art, such as, for example, a #2 size liquid filter bag manufactured and sold by American Melt Blown & Filtration, Inc. As shown in FIG. 1, liquid filter bag 24 comprises closed bottom end 12 and open top end 14. Liquid filter bag 24 is constructed of filter material 26, which may be any liquid permeable filter material suitable for the filtration process into which enhanced liquid filter bag 10 is deployed, such as, for example, polyester felt, polypropylene felt, polypropylene monofilament mesh, polyester multifilament mesh, nylon multifilament mesh, nylon monofilament mesh, nomex felt, and the like. Liquid filter bag 24 comprises ring 16 encircling open top end 14. Ring 16 may be constructed of any rigid material suitable for the filtration process into which enhanced liquid filter bag 10 is deployed, such as, for example, carbon steel, stainless steel, polypropylene, and the like. Ring 16 is sewn into or otherwise affixed to filter material 26 at open top end 14, so that open top end 14 is held by ring 16 in an open, substantially circular configuration. Optionally, enhanced liquid filter bag 10 may further comprise a flexible handle (not shown in FIG. 1) installed across open top end 14.

Enhanced liquid filter bag 10 according to at least one embodiment of the present disclosure further comprises fabric flap 18 and liner 20. In at least one embodiment, fabric flap 18 is constructed of a flexible filter material such as the filter material used in liquid filter bag 24. In other embodiments, the filter material of fabric flap 18 is a different material from the filter material of liquid filter bag 24. Fabric flap 18 comprises a generally tubular shape, with an outer diameter sized to fit within the inner diameter of liquid filter bag 24.

Liner 20 is constructed of a flexible, liquid impermeable material such as a plastic material. Liner 20 also is of a generally tubular shape, with an outer diameter sized to fit within the inner diameter of liquid fabric flap 18. Liner 20 is placed inside fabric flap 18, and then both liner 20 and fabric flap 18 are sewn or otherwise permanently attached to an internal surface of liquid filter bag 24. Stitching 22 in FIG. 1 shows the point at which liner 20 and fabric flap 18 are attached to liquid filter bag 24 in the embodiment of FIG. 1.

In at least one embodiment, fabric flap 18 is of a length sufficient to extend from its point of attachment to liquid filter bag 24 until fabric flap 18 is visible above open top end 14 as shown in FIG. 1. In at least one embodiment, liner 20 is of a length sufficient to extend from its point of attachment to liquid filter bag 24 until liner 20 is visible above open top end 14. In at least one other embodiment, liner 20 is of a length sufficient to extend from its point of attachment to liquid filter bag 24 until liner 20 is visible above fabric flap 18 as shown in FIG. 1.

Figure 2:
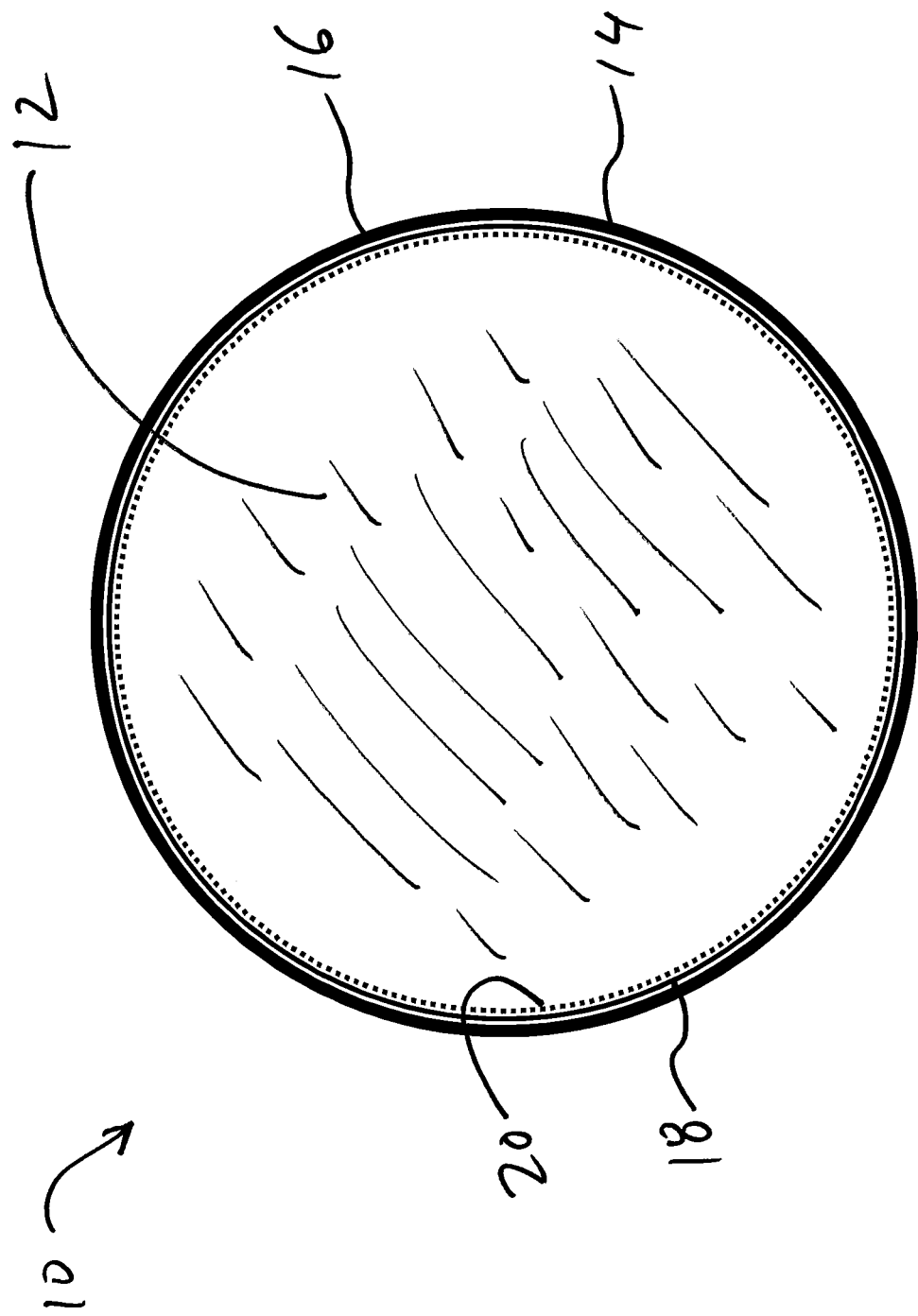
FIG. 2 shows a top view of an enhanced liquid filter bag according to at least one embodiment of the present disclosure.

FIG. 2 shows a view of enhanced liquid filter bag 10 of FIG. 1, looking through open top end 14 into enhanced liquid filter bag 10. Shown in FIG. 2 is enhanced liquid filter bag 10 comprising open top end 14, ring 16, fabric flap 18, and liner 20. Also visible in FIG. 2 is the interior surface of closed bottom end 12.

Figure 3:
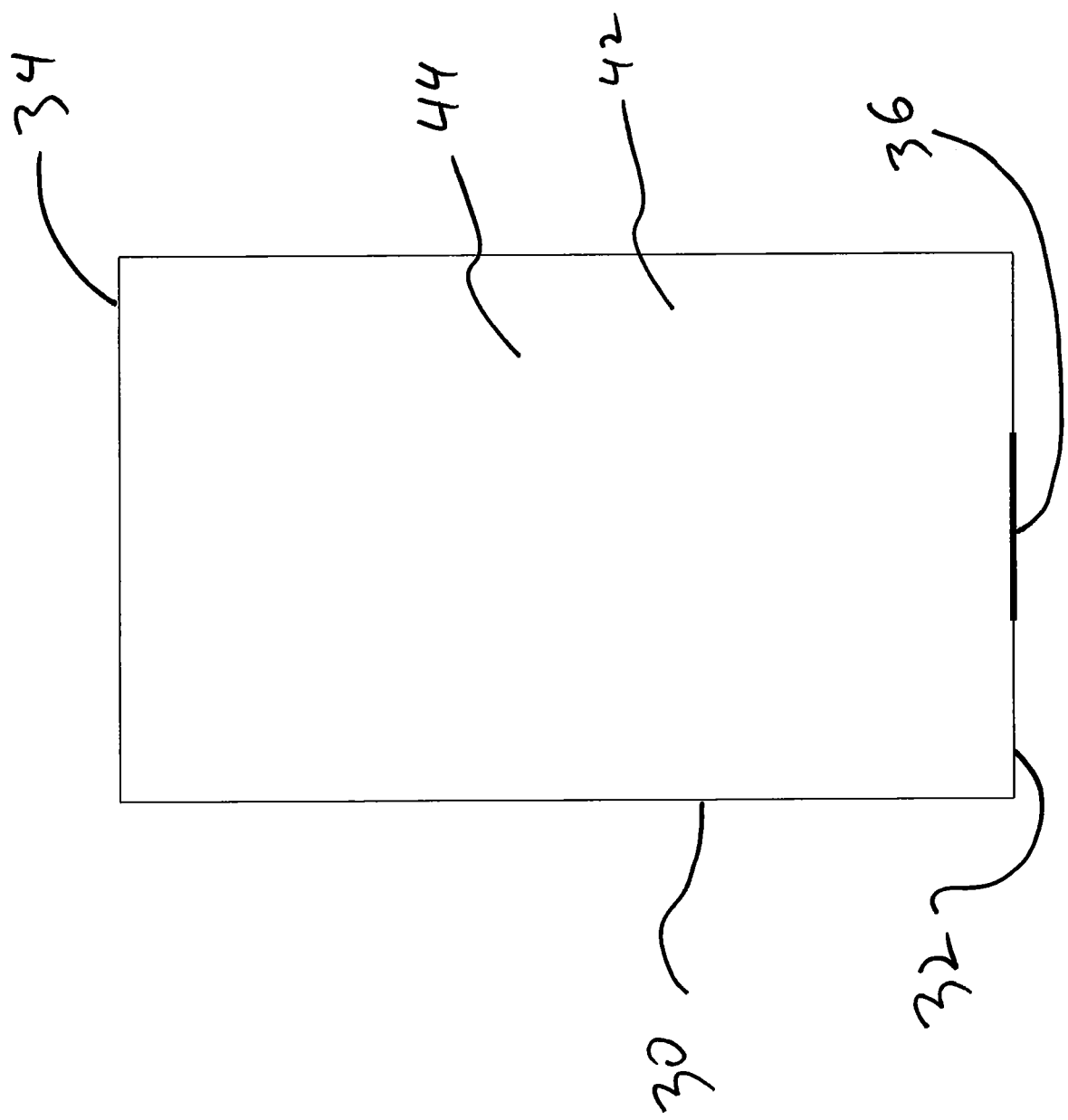
FIG. 3 shows a side view of a filter cartridge according to at least one embodiment of the present disclosure.
Figure 4:
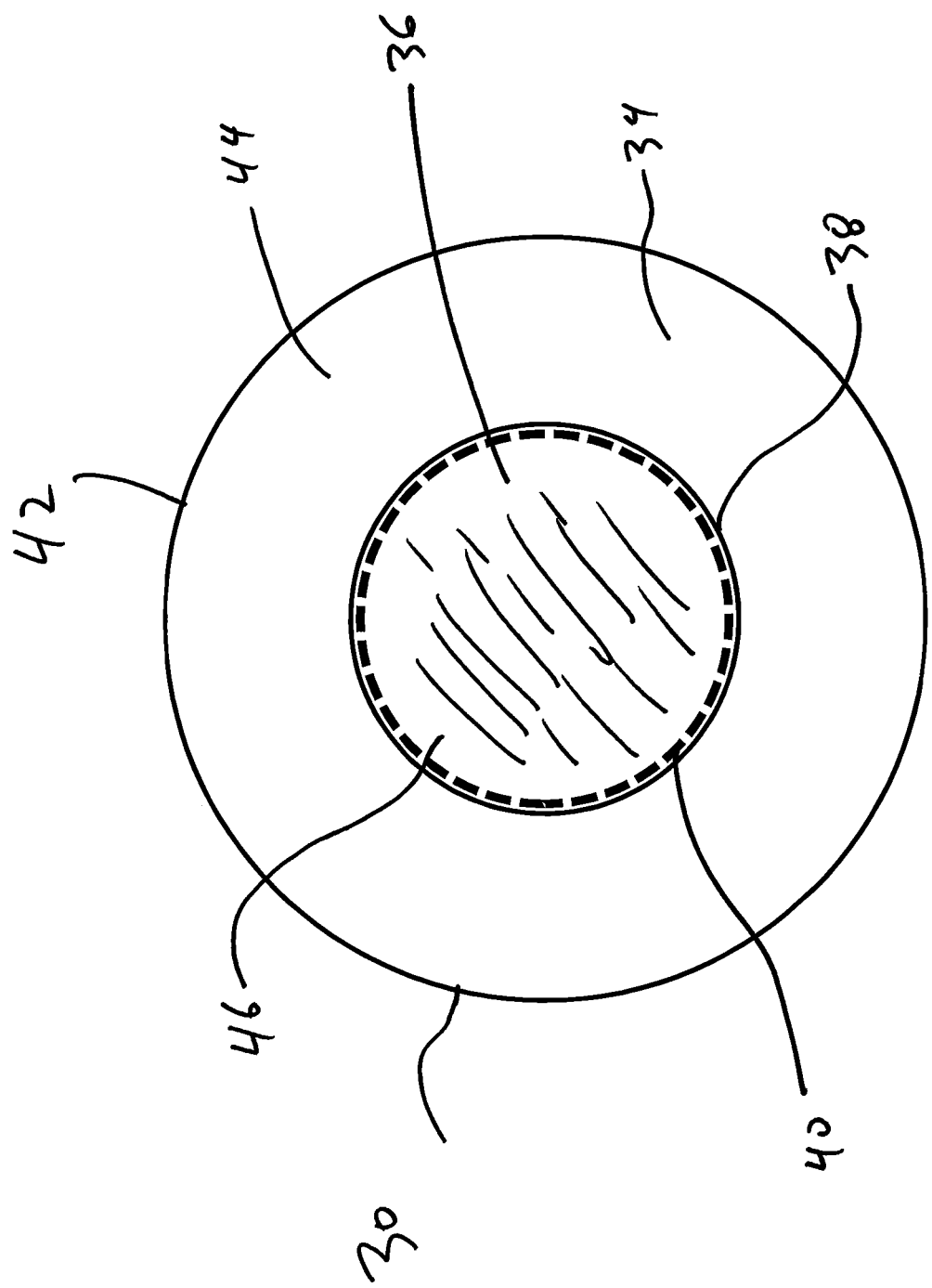
FIG. 4 shows a top view of a filter cartridge according to at least one embodiment of the present disclosure.

FIG. 3 shows a side view of filter cartridge 30 according to at least one embodiment of the present disclosure, and FIG. 4 shows a top view of filter cartridge 30 of FIG. 3. As shown in FIGS. 3-4, filter cartridge 30 is a substantially cylindrical filter cartridge comprising bottom end 32, top end 34, end cap 36, internal wall 38, rigid core 40, and external wall 42. As is shown in FIG. 4, internal wall 38 and external wall 42 are substantially concentric, with internal wall 38 defining void 46 that extends the full height of filter cartridge 30. The interior surface of end cap 36 is visible in FIG. 4 is at the bottom of void 46.

According to at least one embodiment of the present disclosure, filter cartridge 30 is a melt blown filter cartridge of a type known in the art, such as, for example, a melt blown filter manufactured and sold by American Melt Blown & Filtration, Inc. Filter cartridge 30 comprises filter media 44, which may be any liquid permeable filter media suitable for the filtration process into which filter cartridge 30 and/or enhanced liquid filter bag 10 is/are deployed, such as, for example, polypropylene, nylon, and the like. In the embodiment shown in FIGS. 3-4, end cap 36 is affixed to bottom end 32 of filter cartridge 30, such as by thermal welding or another permanent attachment process. End cap 36 is affixed in a manner that closes the bottom end of void 46 so that fluid entering the top end of void 46 cannot escape through the bottom end of void 46. Instead, the fluid is forced through internal wall 38 and into filter media 44. In the embodiment shown in FIGS. 3-4, rigid core 40 is inserted into void 46 and fits snugly against internal wall 38 to add rigidity to filter cartridge 30. Rigid core 40 comprises apertures therethrough (not shown in FIGS. 3-4), thereby allowing fluid entering void 46 to pass through rigid core 40 and reach filter media 44.

Figure 5:
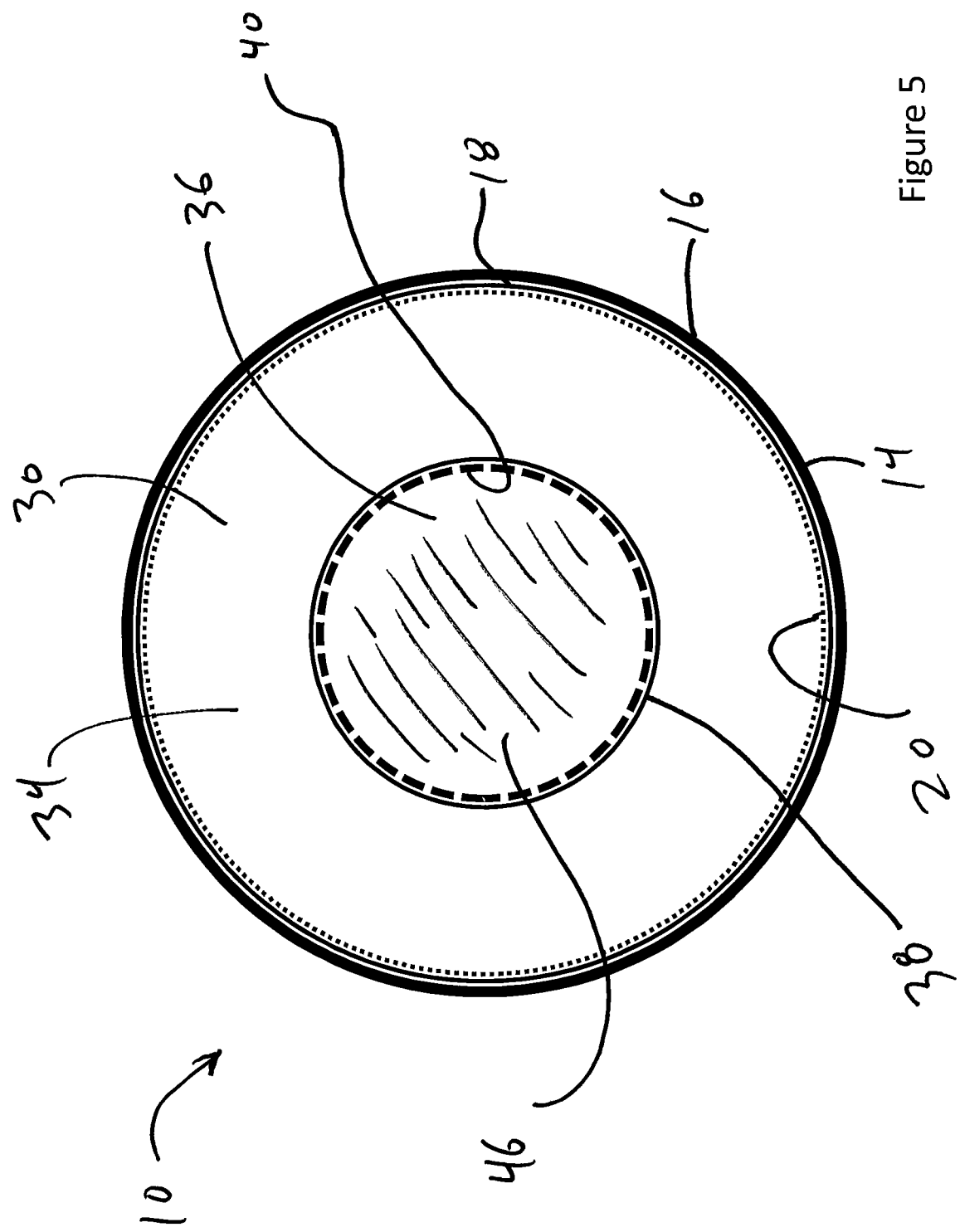
FIG. 5 shows a top view of an enhanced liquid filter bag according to at least one embodiment of the present disclosure with a filter cartridge according to at least one embodiment of the present disclosure inserted therein.

FIG. 5 shows a top view of enhanced liquid filter bag 10 with filter cartridge 30 inserted therein. Shown in FIG. 5 is enhanced liquid filter bag 10 comprising open top end 14, ring 16, fabric flap 18, liner 20, and filter cartridge 30. As shown in FIG. 5, filter cartridge 30 fits snugly within enhanced liquid filter bag 10. The interior surface of end cap 36 is visible in FIG. 5 is at the bottom of void 46.

Figure 6:
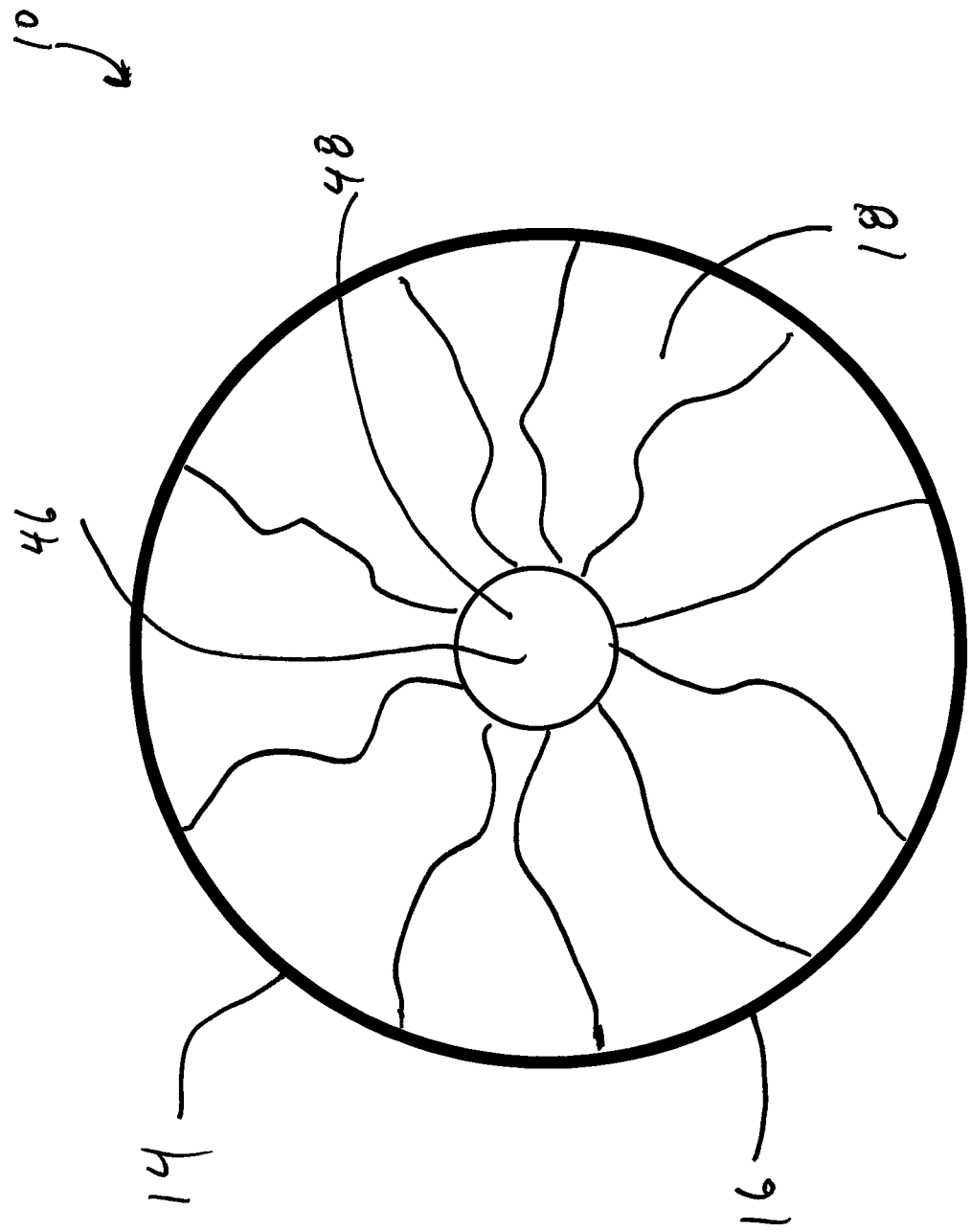
FIG. 6 shows a top view of an enhanced liquid filter bag according to at least one embodiment of the present disclosure with a filter cartridge according to at least one embodiment of the present disclosure inserted therein.

FIG. 6 shows another top view of enhanced liquid filter bag 10 with cylinder 30 inserted therein. In FIG. 6, fabric flap 18 and liner 20 are folded inwardly over top end 34 of filter cartridge 30. The ends of fabric flap 18 and liner 20 are inserted into void 46 in a manner that leaves a gap 48 so that a fluid can enter void 46 through gap 48. When fabric flap 18 and liner 20 are folded inwardly over top end 34 of filter cartridge 30 and the ends of fabric flap 18 and liner 20 are inserted into void 46, fabric flap 18 covers liner 20, and liner 20 no longer is visible from open top end 14, except that the end of liner 20 may be visible in gap 48. As shown in FIG. 6, the inward folding of fabric flap 18 and liner 20 causes fabric flap 18 and liner 20 to crease and overlap as the material of fabric flap 18 and liner 20 is urged toward void 46.

Figure 7:
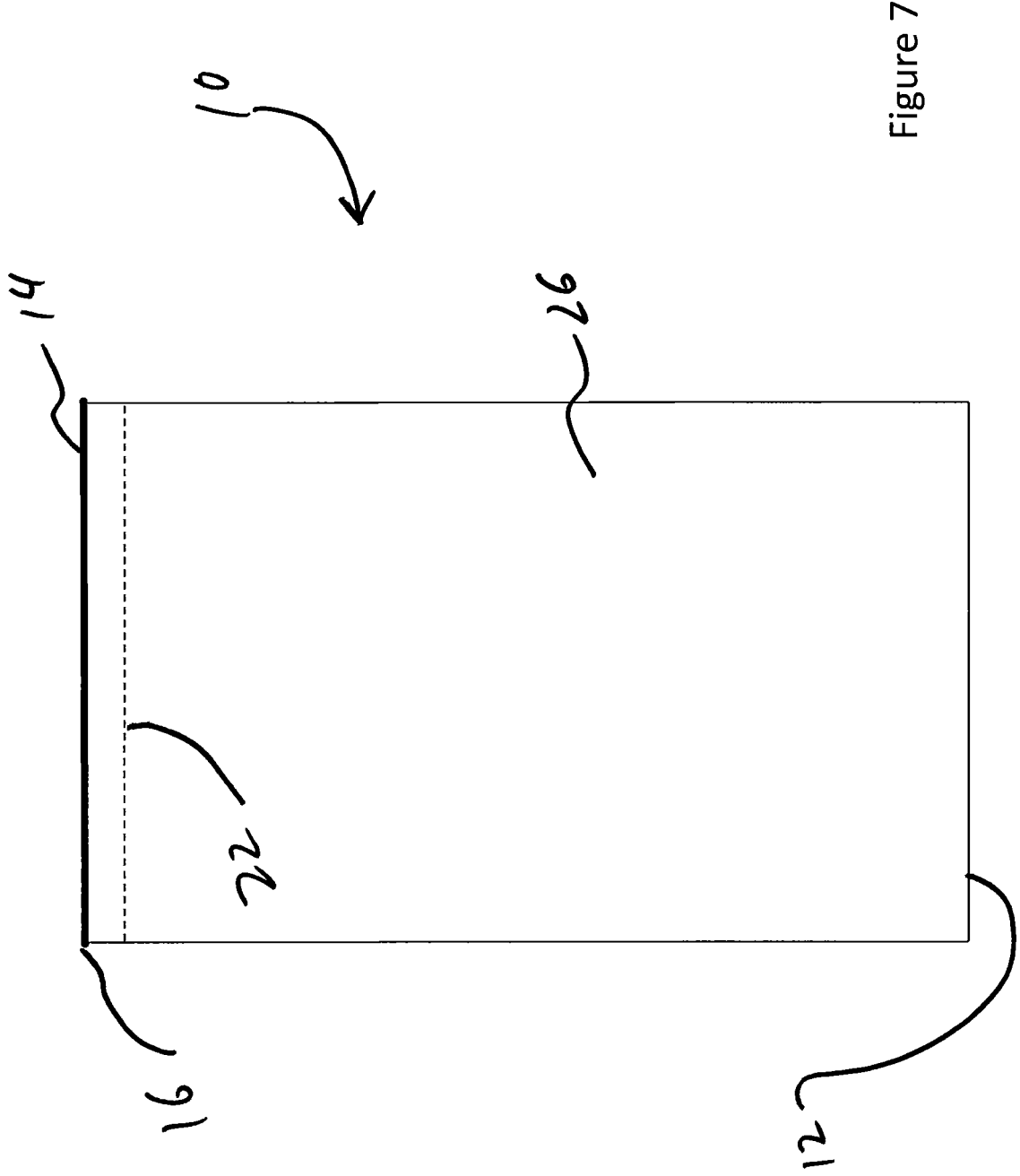
FIG. 7 shows a side view of an enhanced liquid filter bag according to at least one embodiment of the present disclosure with a filter cartridge according to at least one embodiment of the present disclosure inserted therein.

FIG. 7 shows a side view of enhanced liquid filter bag 10 of FIG. 6. In the embodiment shown in FIG. 7, after fabric flap 18 and liner 20 are folded inwardly over top end 34 of filter cartridge 30 and the ends of fabric flap 18 and liner 20 are inserted into void 46, fabric flap 18 and liner 20 are no longer visible above ring 16 from a side view.

In use, enhanced liquid filter bag 10 as shown in FIGS. 6-7 is deployed into a fluid filtration process. Fluid is introduced into enhanced liquid filter bag 10 through top end 14, which is held in a substantially circular shape by ring 16. However, liner 20 covers top end 34 of filter cartridge 30 and extends into void 46 of liquid filter cartridge 30, and because liner 20 is impermeable to fluids, the fluid entering top end 14 of enhanced liquid filter bag 10 is directed through gap 48 and into void 46. As additional fluid is introduced into top end 14 of enhanced liquid filter bag 10, the building pressure forces the fluid through internal wall 38, through filter material 44, through external wall 42, and through filter material 26, thereby effectively filtering the fluid.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A liquid filter bag comprising:
   a bag shaped filter material comprising an open end and a closed end and enclosing a volume;
   a filter cartridge, said filter cartridge having a cylindrical shape, a top end, a bottom end, an external wall, and an internal wall, said external wall and said internal wall being concentric, said internal wall defining a void that extends from said top end to said bottom end of said filter cartridge, said filter cartridge installed within said volume of said bag shaped filter material with said bottom end of said filter cartridge adjacent an internal surface of said closed end of said bag shaped filter material; and
   a liquid impermeable liner material, said liquid impermeable liner material having a first open end, a second open end, and a tubular shape, said first open end of said liquid impermeable liner material being secured to an inside surface of said bag shaped filter material and said second open end of said liquid impermeable liner material being unsecured so that said second open end of said liquid impermeable liner material can be moved between a first position where said second open end of said liquid impermeable liner material extends out of said open end of said bag shaped filter material and a second position where said second open end of said liquid impermeable liner material is within said volume enclosed by said bag shaped filter material.

2. The liquid filter bag of claim 1, further comprising:
   a rigid core within said void, said rigid core having cylindrical shape, said rigid core abutting said internal wall of said filter cartridge.

3. The liquid filter bag of claim 1, further comprising:
a liquid impermeable cap installed over said void at said bottom end of said filter cartridge.

4. The liquid filter bag of claim 1, wherein when said second open end of said liquid impermeable liner material is within said volume enclosed by said bag shaped filter material, said second end of said liquid impermeable liner material is inserted into said void adjacent said top end of said filter cartridge, whereby said liquid impermeable liner covers said top end of said filter cartridge except for a portion of said void.

5. The liquid filter bag of claim 1, further comprising:
a fabric flap, said fabric flap constructed of a liquid permeable material, said fabric flap having a first open end, a second open end, and a tubular shape, said fabric flap installed adjacent to said liquid impermeable liner material with said first open end of said fabric flap secured to said inside surface of said bag shaped filter material and said second open end of said fabric flap being unsecured so that said second open end of said fabric flap can be moved between a first position where said second open end of said fabric flap extends out of said open end of said bag shaped filter material and a second position where said second open end of said fabric flap is within said volume enclosed by said bag shaped filter material.

6. The liquid filter bag of claim 5, wherein when said second open end of said fabric flap is within said volume enclosed by said bag shaped filter material, said second end of said fabric flap is inserted into said void adjacent said top end of said filter cartridge, whereby said fabric flap covers said top end of said filter cartridge except for a portion of said void.

7. The liquid filter bag of claim 5, wherein when said second open end of said liquid impermeable liner material is within said volume enclosed by said bag shaped filter material, said second end of said liquid impermeable liner material is inserted into said void adjacent said top end of said filter cartridge, whereby said liquid impermeable liner covers said top end of said filter cartridge except for a portion of said void; and wherein when said second open end of said fabric flap is within said volume enclosed by said bag shaped filter material, said second end of said fabric flap is inserted into said void adjacent said top end of said filter cartridge, whereby said fabric flap covers said top end of said filter cartridge except for a portion of said void.

* * * * *